United States Patent [19]

Kishi et al.

[11] Patent Number: 5,452,217
[45] Date of Patent: Sep. 19, 1995

[54] NAVIGATION SYSTEM FOR GUIDING VEHICLE ORALLY

[75] Inventors: Hiroshi Kishi; Toru Ito, both of Toyota; Kyomi Morimoto, Nishio; Shoji Yokoyama, Anjo; Kenji Kuroda, Sabae; Kiyohide Katoh, Chiryu; Masanari Yamamoto, Handa, all of Japan

[73] Assignee: Aisin AW Co., Ltd., Anjo, Japan

[21] Appl. No.: 92,814

[22] Filed: Jul. 19, 1993

[30] Foreign Application Priority Data

| Jul. 20, 1992 | [JP] | Japan | 4-192494 |
| Jul. 20, 1992 | [JP] | Japan | 4-192495 |
| Aug. 19, 1992 | [JP] | Japan | 4-219956 |

[51] Int. Cl.⁶ ............................................ G06F 15/50
[52] U.S. Cl. ................................. 364/449; 364/444; 340/990; 340/995
[58] Field of Search ........................ 364/443, 444, 449; 73/178 R; 340/988, 990, 995

[56] References Cited

U.S. PATENT DOCUMENTS

| 4,757,455 | 7/1988 | Tsunoda et al. | 364/449 |
| 4,882,696 | 11/1989 | Nimura et al. | 340/988 |
| 4,937,751 | 6/1990 | Nimura et al. | 340/990 |
| 4,982,359 | 1/1991 | Kamiyama et al. | 340/988 |
| 5,043,902 | 8/1991 | Yokoyama et al. | 364/444 |
| 5,266,948 | 11/1993 | Matsumoto | 340/990 |

FOREIGN PATENT DOCUMENTS

| 62-267900 | 11/1987 | Japan . |
| 1173815 | 7/1989 | Japan . |
| 1173817 | 7/1989 | Japan . |
| 2-4285 | 1/1990 | Japan . |
| 2103584 | 4/1990 | Japan . |
| 3137679 | 6/1991 | Japan . |
| 3269317 | 11/1991 | Japan . |
| 4001897 | 1/1992 | Japan . |
| 4001898 | 1/1992 | Japan . |

Primary Examiner—Gary Chin
Attorney, Agent, or Firm—Cushman, Darby & Cushman

[57] ABSTRACT

A vehicle route guidance system includes a map information storage section 10 which has a road type storage section 10a for storing various types of roads such as toll roads, express highways and motorways. A route guidance control section 26 reads out map information including road type information and route information. A road type change point detecting section 26a detects a road type change point. The route guidance control section 26 causes a display 28 and a voice controller 30 to perform the route guidance when a vehicle approaches a point a given distance short of the road type change point. The voice controller 30 responds to the instruction from the route guidance control section 26 to announce the route guidance for informing the driver of the entry to a toll road, express highway or motorway.

10 Claims, 5 Drawing Sheets

NAVIGATION SYSTEM FOR GUIDING VEHICLE ORALLY

BACKGROUND OF THE INVENTION i) Field of the Invention

The present invention relates to a navigation system mounted to a vehicle for guiding a vehicle such as a car according to a predetermined route, and more particularly to a vehicle navigation system to orally inform a driver of a route to be selected.

ii) Description of the Related Art

Conventionally, in order to reduce a driver's load, a variety of devices have been proposed and mounted to a vehicle and a navigation system for guiding a vehicle to a destination along a route is known. In this navigation system, when the vehicle passes through a branch point such as an intersection, a route to be selected is advised to a driver. In an example of a navigation system put to a practical use, an image display device using a display is provided on an instrument panel of the vehicle and a route is advised to the driver.

In addition to the information by the image display, another navigation system for issuing route information orally has been known. For example, as disclosed in Japanese Patent Laid-Open No. Sho 62-267900, in a navigation system, when the vehicle has reached a predetermined position (30 m) before an intersection, in order to advise route information, an indication is given to the driver orally. In such a navigation system using a voice, there is no need for the driver to look at a display and he can concentrate on looking ahead.

In the route guiding system of the prior art, however, oral route guidance is issued only with respect to right-turns and left-turns at crossroads, but not to driving straight or adjacent roads. Toll roads, express highways and motorways have many entries along the roads, rather than intersecting points. Therefore, no oral route guidance is issued for such roads. This may puzzle many drivers.

Particularly, if the entry into a toll road or the like is located adjacent to the general road, a driver may become puzzled without route guidance.

SUMMARY OF THE INVENTION

It is therefore an object of the present invention to provide a vehicle route guidance system for informing a driver about the entry into a toll road or the like.

To this end, the present invention provides a vehicle route guidance system comprising means for detecting a road type change point from the general road to a toll road, express highway or motorway or vice versa and means for performing route guidance at a given distance short of the road type change point detected by the road type change point detecting means.

In this manner, the vehicle route guidance system can inform the driver of the road type change point from the general road to a toll road, express highway or motorway or vice versa. Therefore, the driver can properly judge whether or not he or she may enter a toll road, express highway or motorway having no definite branch or Intersecting point.

DETAILED DESCRIPTION OF THE PREFERRED EMBODIMENTS

Figure 1:
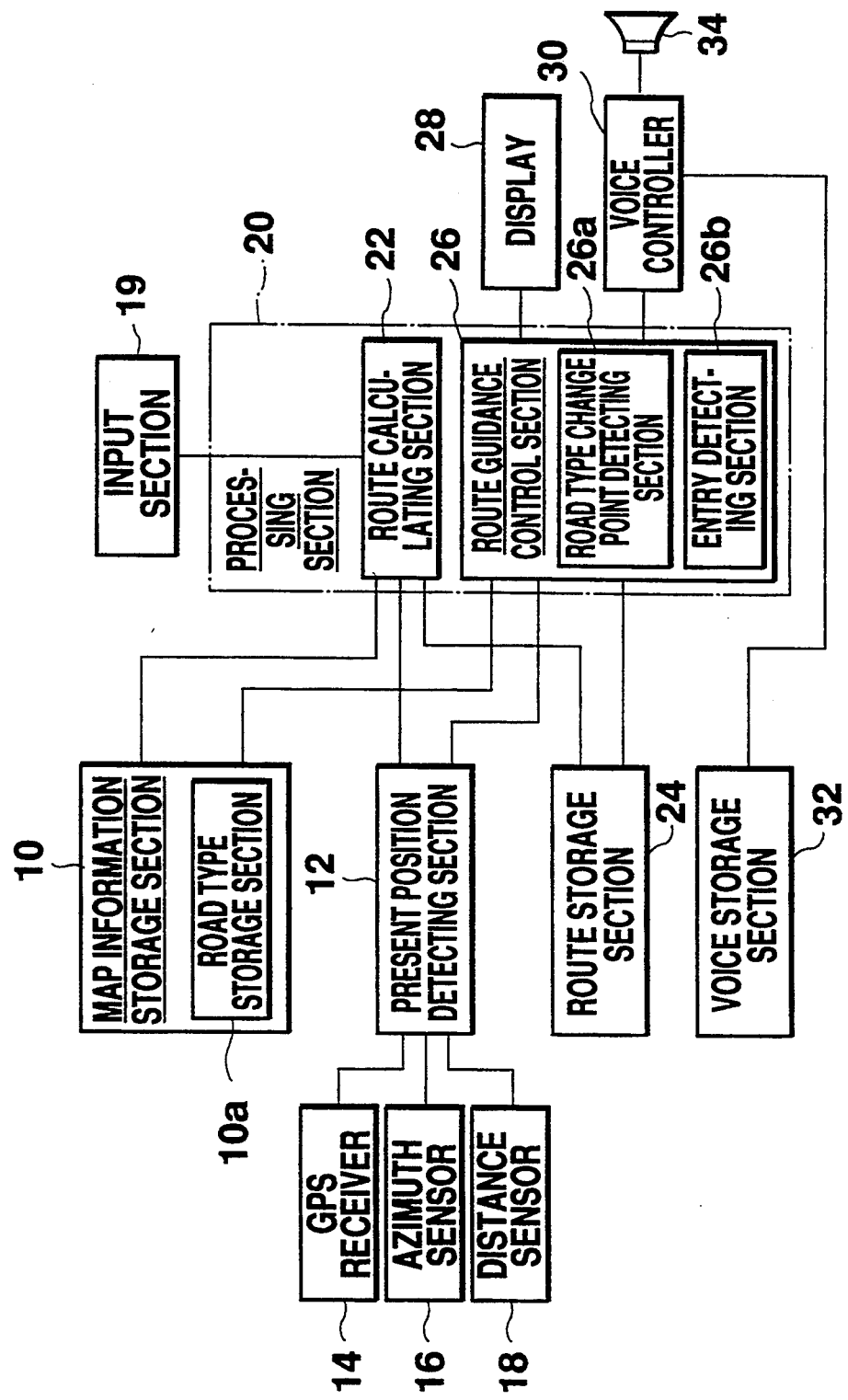
FIG. 1 is a block diagram of one preferred embodiment of a vehicle route guidance system constructed in accordance with the present invention.

Referring now to FIG. 1, there is shown a vehicle route guidance system constructed in accordance with the present invention, which comprises a map information storage section 10 that contains previously stored information of roads, place names, building names, river names and so on. Map information may be read out from the map information storage section 10, if necessary. The system also comprises a GPS receiver 14 utilizing a satellite navigation system (hereinafter referred to as "GPS") for measuring the present position of a vehicle on which the vehicle route guidance system is mounted, an azimuth sensor 16 for detecting the azimuth of the moving vehicle based on the earths magnetism, a distance sensor 18 for detecting the mileage from the revolutions of the vehicle wheels, and a present position measuring section 12 for detecting the present position of the vehicle from the results of the azimuth and distance sensors 16, 18.

For guidance along a route to a destination, the destination place name is input into the system through an input section 19 or specified on a display, which will be described, through the input section 19. A processing section 20 includes a route calculating section 22 which calculates a route from the present position obtained by the present position measuring section 12 to the destination. The calculated route is then stored in a route storage section 24.

After the route has been determined through input of the destination, the route guidance is actually carried out. The processing section 20 includes a route guidance control section 26 which reads information of a map around the vehicle from the map information storage section 10. This information is displayed on a display section 28 with the present position and direction of the vehicle and the route stored in the route storage section 24.

Figure 2:
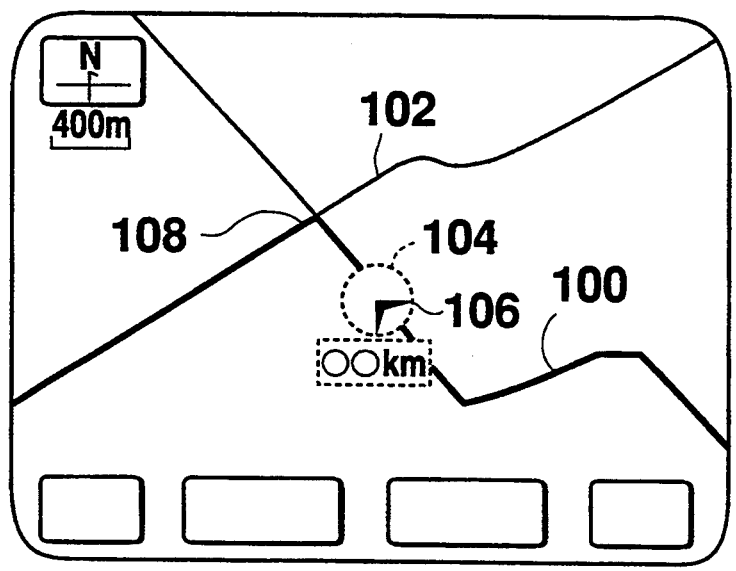
FIG. 2 is a scene displayed in the vehicle route guidance system of FIG. 1.

The display section 28 is disposed in an instrument panel adjacent to the driver's seat. The driver can confirm the present position of the vehicle and the course to be followed by the vehicle through the display section 28. An example of the display is shown in FIG. 2. In FIG. 2, the selected route is shown by a thick line 100 and the other roads are shown by thin lines 102. The present position of the vehicle is shown by a circle 104 with the direction thereof being shown by a wedge-shaped arrow 106. The lines indicating the selected route and other roads may also be distinguished from each other by colors.

Figure 3:
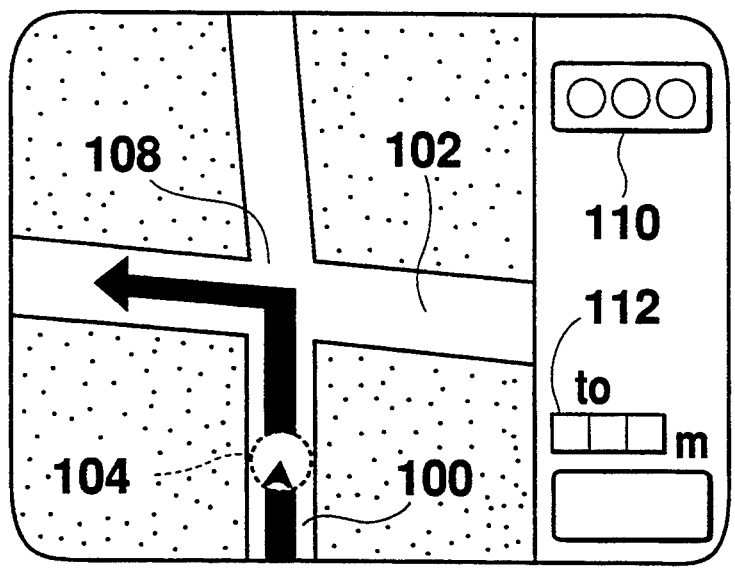
FIG. 3 is another scene displayed in the vehicle route guidance system of FIG. 1, showing, in an enlarged scale, the approach to a crossroad at which the vehicle should be turn to the right or left.

When the vehicle approaches a crossroad 108 at which the course should be changed, the scene on the display is changed to an enlarged map of the vicinity of the crossroad as shown in FIG. 3, the enlarged map indicating the name of the crossroad 110 and the distance from the vehicle to the crossroad 110. At the same time, the route guidance control section 26 controls a voice controller 30 which generates speech for issuing the route guidance at the crossroad. The voice controller 30 reads information from a voice storage section in which the information has been stored as digital data. The digital data is converted into analog data to drive a speaker 34. The speaker 34 produces the route guidance, for example, such as "turn to the left at the next crossroad" to the driver. Such guidance is issued at fixed distance intervals until the vehicle has passed through the crossroad.

Figure 4:
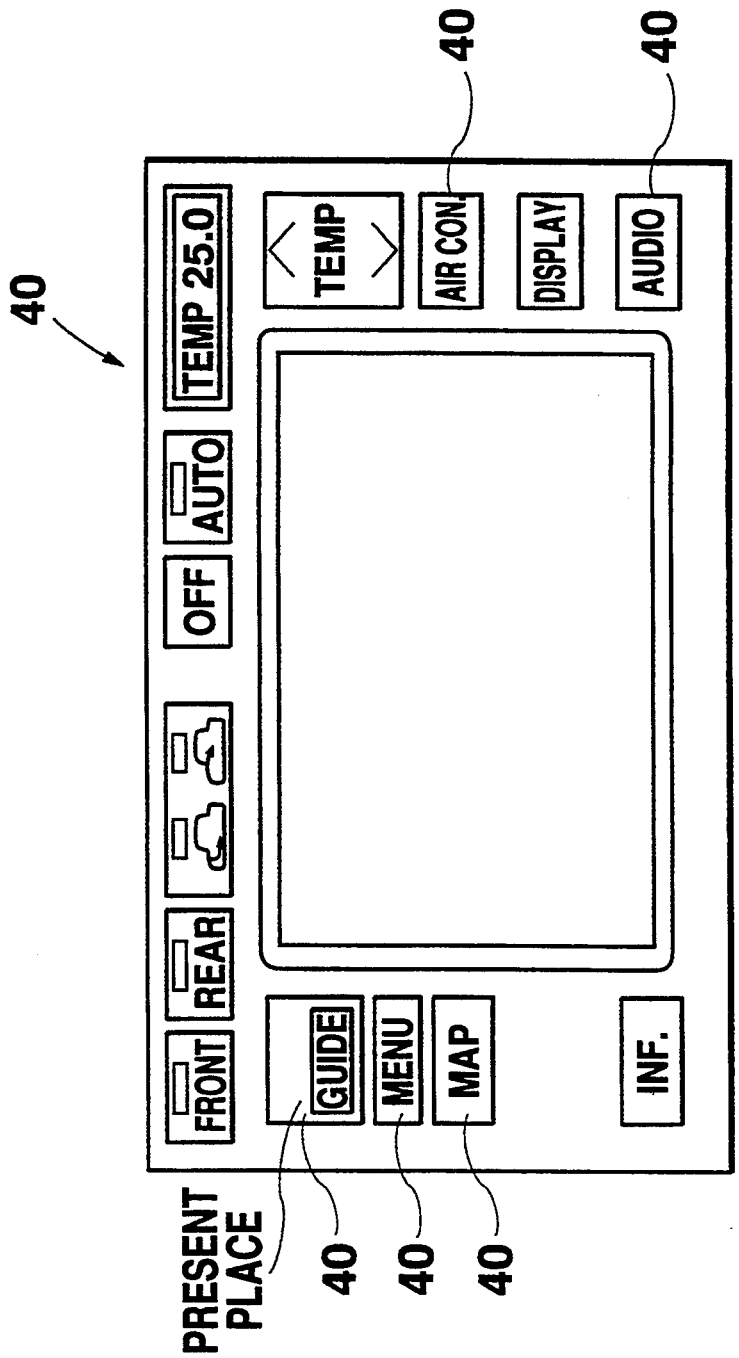
FIG. 4 is a front view of a display/touch-button panel.
Figure 5:
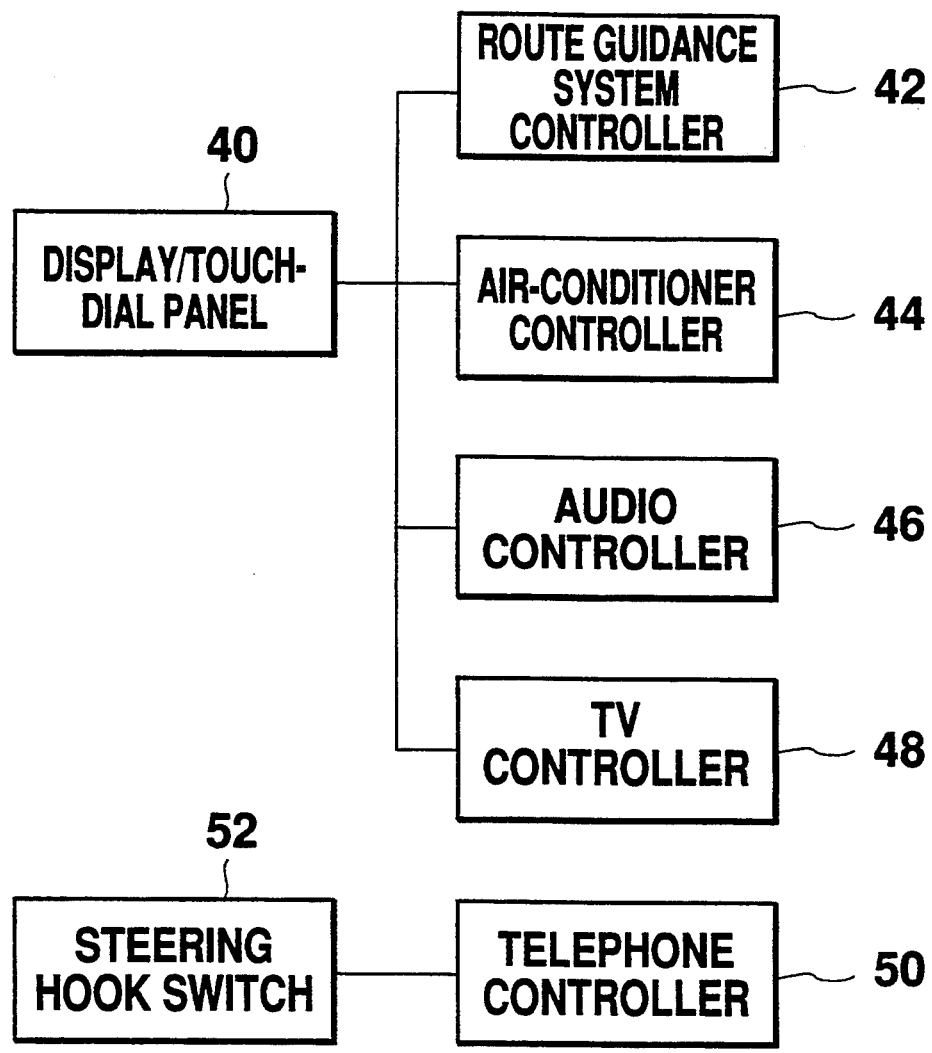
FIG. 5 is a block diagram illustrating the display/touch-button panel of FIG. 4 used as input means for various instruments.

In the present embodiment, the display and input sections 28, 19 constitute a display/touch-dial panel 40 which contains input keys within the displayed scene. More particularly, the driver can input data such as place name or the like into the system when he or she touches various input keys displayed in the display/touch-dial panel 40 with his or her finger. As shown in FIG. 4, the display/touch-dial panel 40 includes a menu key 40a used to return to a menu scene for selecting various processes such as input of destination, adjustment of volume and so on, a map key 10b used to indicate maps, a present position/guidance key 40c used to return to the scene displaying the present position of the vehicle or to request the guidance in that condition and so on.

Reference has been made to the display/touch-dial panel 40 used as input means for the route guidance system 42. The display/touch-dial panel 40 according to the present embodiment may function as input means for commands for an air-conditioner, audio set, TV set and telephone set and can be connected to controllers for these devices. More particularly, the display/touch-dial panel 40 are connected to an air-conditioner controller 44, an audio controller 46, a TV controller 48 and a telephone controller 50. The display/touch-dial panel further includes an air-conditioner key 40d for causing display of a panel used to adjust the air-conditioner and an audio key 40e for causing display of a panel used to adjust the audio set.

Figure 6:
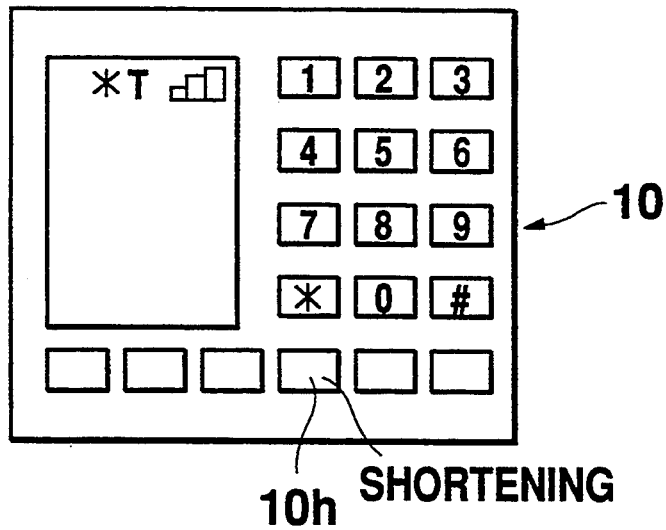
FIG. 6 is the basic view of a telephone.

Although the telephone set itself has dial keys and control keys, it may also be controlled through the display/touch-dial panel 40. For such a purpose, a steering device in the vehicle may include a steering hook switch 52 which is depressed to display such a basic telephone panel as is shown in FIG. 6 on the display/touch-dial panel 40. The basic telephone panel may be used to actuate the telephone controller 50 for energizing the telephone set. The basic telephone panel may be displayed only when the steering hook switch 52 is depressed under a condition of displaying any map scene on the display/touch-dial panel 40.

Figure 7:
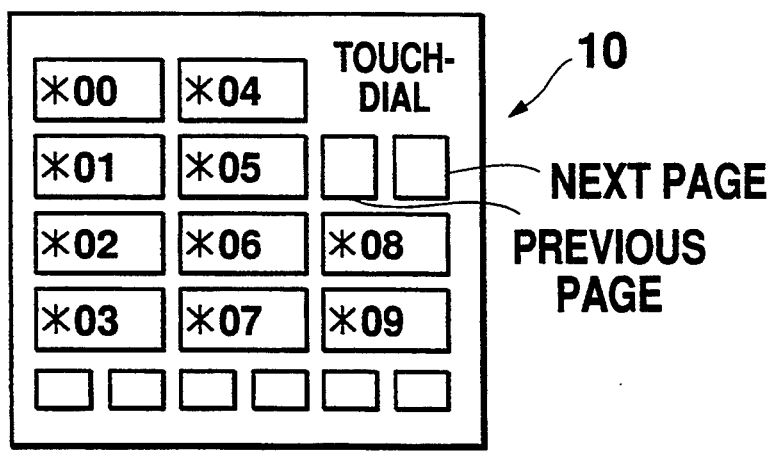
FIG. 7 is the touch-dial panel of a telephone.

The basic telephone panel indicates number keys for dialing the telephone. When the driver touches the number keys, the dialing is carried out to output the corresponding telephone number from the telephone set. When a shortening key 10h is touched by the driver during the driving of the vehicle or in the basic telephone mode, the display immediately indicates a short dial code panel of FIG. 7. When the driver touches any one of the short dial code keys, a telephone number which has been registered in the system as a short dial code is automatically dialed.

When the map key 40b in the display/touch-dial panel 40 is touched by the driver under such a condition, the map for guiding the selected route may be displayed irrespective of whether or not the telephone is in operation.

When the steering hook switch 42 is depressed during display of the map scene, the system is returned back to the display of basic telephone panel. In such a manner, the map and telephone displays can been switched from one to another simply by actuating the map key and steering hook switch 42.

When the steering hook switch 42 is depressed during display of the telephone panel, the telephone communication is terminated. At the same time, the display in the display/touch-dial panel 40 returns back to the map scene that was being shown before the telephone communication was initiated. If the steering hook switch 42 is successively depressed two times while the map scene is displayed, the telephone communication is terminated without indication of the telephone panel. When any display other than the map scene is shown on the display/touch-dial panel 40 and if the steering hook switch 42 is depressed, the basic telephone panel is displayed in the display/touch-dial panel 40.

The vehicle route guidance system according to the present embodiment can make a guidance of a road type change point including the entry from the general road into a toll road, express highway or motorway or vice versa as in the case of the crossroad. For example, such guidance may be carried out at a given distance, for example, such as 300 meters, short of the road type change point.

The map information storage section 10 includes a road type storage section 10a which contains stored information of road types including general roads, toll roads, express highways and motorways. A road type change point detecting section 26a detects a road type change point from the selected road to any different road, based on the route information stored in the route storage section 24 and the map information stored in the road type storage section 10a. When the route guidance control section 26 detects that the vehicle is approaching the road type change point, the vehicle route guidance system informs the driver of the entry to the different road. The guidance may be made both by the display and voice control sections 28, 30 as in the case of a crossroad.

The voice guidance is preferably performed to advise the name of a road such as a toll road into which the vehicle is to enter. For example, the system announces "You are about to enter the TOMEI express highway. Be careful." Alternatively, the system may announce only the type of road, such as toll road, express highway or motorway.

In such a manner, the vehicle route guidance system of the present invention can search the road type storage section 10a with respect to whether or not there is a road different in type from the road on which the vehicle is currently moving within a given distance ahead of the vehicle, based on the present position of the vehicle measured by the present position measuring section 12. If there is a road of a different type, the vehicle route guidance system detects a point at which both the roads intersect as a road type change point. The route guidance will be issued at a given distance short of the road type change point.

Although the vehicle route guidance system has been described as to the regular detection of a road type change point, various road type change points may have been stored in the route storage section 24. If any one of the stored road type change points is detected by the system within a given distance ahead of the vehicle, the route guidance will be issued. This can obviate the regular monitoring of road type change. Furthermore, the route storage section may have stored points at each of which the route guidance should be carried out within a given distance short of the road type change point.

When the vehicle enters a different road such as a toll road from the general road, this is detected by the system to issue the route guidance matching that particular toll road. Such a detection is performed by an entry detecting section 26b included in the route guidance control section 26. More particularly, the position of the vehicle on the map and route stored in the map information and route storage sections 10, 24 is detected by the system. The system further judges on which road the detected vehicle position is.

When the entry to a road such as a toll road through an interchange or ramp is detected and if the exit from this road is an interchange such as a C-interchange, the vehicle route guidance system announces "this is a route where you will exit at a C-interchange". If the exit is a ramp or the like, an announcement "this is a route where you will exit at the exit C" will be issued. If that exit has no name, another announcement "you move along the road about XX kilometers" will be issued. Thus, the driver can confirm that he or she is on the correct road and, to which exit they must proceed along this road.

If the vehicle travels on a toll road or the like having a limited speed of 60 km/h, the guidance for a junction or interchange is Initiated at a distance of two kilometers short of such a point. When the vehicle passes through one interchange or the like before the objective exit, the announcement "this is a route where you will exit at a C-interchange" is again issued. An announcement "C-interchange exit at about two kilometers (or one kilometer)" is issued at two kilometers or one kilometer short of the objective interchange. At 500 meters short of the objective interchange, an announcement "C-interchange exit at about 500 meters. Be careful" is issued. The announcement of district has preference at the route guidance of an interchange or Junction. If any guidance of direction should be made, the indication of left or right will not be made. For example, an announcement "you will travel in the district of XX at about one kilometers" may be issued. Only there is no guidance of district, an announcement "turn to the left at about one kilometer" will be issued.

Thus, the driver will be prevented from being puzzled on entering a toll road or the other high-level road which frequently has its entry disposed parallel to the general road.

Further, the vehicle route guidance system of the present invention may issue such a route guidance as described as on changing the course from a toll road to an express highway.

When the vehicle enters a toll road or the like, it is detected by the vehicle route guidance system which in turn performs route guidance. Since it is normal for a toll road or the like to have less intersecting or branch points, many drivers are frequently puzzled as to whether or not they are traveling on the correct road. This is prevented by the vehicle route guidance system of the present invention. When the vehicle travels on a road having a limited speed of 60 km/h or higher, the route guidance can be carried out depending on the speed of the vehicle. Thus, the driver can operate the vehicle with composure.

Furthermore the system of the present application to inform a route orally and display of a panel is described in the preferred embodiment. In addition, the system is also avaiable to inform a route only display.

What is claimed is:

1. A vehicle route guidance system for performing route guidance, comprising:
   means for detecting a present position of a vehicle;
   means for storing information of a route from said present position of said vehicle to a destination;
   means for detecting a first road type of a road on which said vehicle is travelling, said first road type being one of a general road, a toll road, an express highway, and a motorway;
   means for detecting a road type change position on said route at which said road on which said vehicle is travelling changes from said first road type to a second road type being a different one of Said general road, said toll road, said express highway, and said motorway detected as said first road type; and
   means for performing road type change route guidance when said first road type changes to said second road type and when said vehicle is a predetermined distance from said detected road type change position.

2. A vehicle route guidance system for performing route guidance according to claim 1, further comprising voice control means for issuing an oral voice guidance of said road type change when said first road type changes to said second road type.

3. A vehicle route guidance system for performing route guidance according to claim 1, further comprising:
   means for detecting a passage of said vehicle through said road type change position;
   means for performing said route guidance based on said second road type.

4. A vehicle route guidance system for performing route guidance according to claim 1, wherein information of said road type includes a name of said road and a direction thereof.

5. A method for performing route guidance for a vehicle, said method comprising the steps of:
   detecting a present position of said vehicle;
   storing information of a route from said present position of said vehicle to a destination;
   detecting a first road type of a road on which said vehicle is traveling, said first road type being one of a general road, a toll road, an express highway, and a motorway;
   detecting a road type change position on said route at which said road on which said vehicle is travelling changes from said first road type to a second road type being a different one of said general road, said toll road, said express highway, and said motorway detected as said first road type; and
   performing road type change route guidance when said road type change position is detected and when said vehicle is a predetermined distance from said detected road type change position.

6. A method for performing route guidance for a vehicle according to claim 5, said step of performing road type change route guidance includes a step of informing a driver of said vehicle of a name of said road and a step of informing said driver of a direction of said road.

7. A method for performing the route guidance for a vehicle, said method comprising the steps of:
detecting a present position of said vehicle;
storing a route from said present position of said vehicle to a destination, a first road type of a road on which said vehicle is traveling being one of a general road, a toll road, an express highway, and a motorway, and a road type change position at which said first road type changes to a different one of said general road, said toll road, said express highway, and said motorway than said first road type; and
performing road type change route guidance when said first road type changes and when said vehicle reaches a position on said route a predetermined distance from said stored road type change position.

8. A method for performing route guidance for a vehicle according to claim 7, said step of performing road type change route guidance includes a step of informing a driver of said vehicle of a name of said road and a step of informing said driver of a direction of said road.

9. A method for performing route guidance for a vehicle, said method comprising the steps of:
detecting a present position of said vehicle;
storing a route from said present position of said vehicle to a destination and a road type change guidance position a predetermined distance from a road type change position at which a first road type of said route changes to a second road type, said first and second road types being different ones of a general road, a toll road, an express highway, and a motorway; and
performing road type change route guidance at said road type change position when said first road type changes to said second road type and when said vehicle reaches said road type change position.

10. A method for performing route guidance for a vehicle according to claim 9, said step of performing road type change route guidance includes a step of informing a driver of said vehicle of a name of said road and a step of informing said driver of a direction of said road.

* * * * *